(12) United States Patent
Freeman et al.

(10) Patent No.: US 12,211,297 B2
(45) Date of Patent: Jan. 28, 2025

(54) METHOD AND DEVICE FOR CLASSIFYING PIXELS OF AN IMAGE

(71) Applicant: Aptiv Technologies AG, Schaffhausen (CH)

(72) Inventors: Ido Freeman, Düsseldorf (DE); Pascal Colling, Wuppertal (DE)

(73) Assignee: Aptiv Technologies AG, Schaffhausen (CH)

( * ) Notice: Subject to any disclaimer, the term of this patent is extended or adjusted under 35 U.S.C. 154(b) by 405 days.

(21) Appl. No.: 17/579,536

(22) Filed: Jan. 19, 2022

(65) Prior Publication Data

US 2022/0245955 A1 Aug. 4, 2022

(30) Foreign Application Priority Data

Jan. 29, 2021 (EP) .................................. 21154378

(51) Int. Cl.
*G06V 20/70* (2022.01)
*G06T 7/12* (2017.01)
(Continued)

(52) U.S. Cl.
CPC ............... *G06V 20/70* (2022.01); *G06T 7/12* (2017.01); *G06T 7/13* (2017.01); *G06T 7/62* (2017.01);
(Continued)

(58) Field of Classification Search
CPC ...... G06V 20/70; G06V 10/26; G06V 10/764; G06V 10/7747; G06V 10/82; G06V 20/58;
(Continued)

(56) References Cited

U.S. PATENT DOCUMENTS

| 10,861,160 | B2  | 12/2020 | Freeman et al. |
|---|---|---|---|
| 2015/0030255 | A1* | 1/2015 | Wu ..................... G06V 10/809 382/224 |

(Continued)

FOREIGN PATENT DOCUMENTS

| CN | 106874921 A | 6/2017 |
|---|---|---|
| CN | 109858315 A | 6/2019 |

(Continued)

OTHER PUBLICATIONS

"Extended European Search Report", EP Application No. 17196983.5, Apr. 16, 2018, 7 pages.

(Continued)

*Primary Examiner* — Siamak Harandi
(74) *Attorney, Agent, or Firm* — Harness, Dickey & Pierce, P.L.C.

(57) ABSTRACT

A method is provided for classifying pixels of an image. An image comprising a plurality of pixels is captured by a sensor device. A neural network is used for estimating probability values for each pixel, each probability value indicating the probability for the respective pixel being associated with one of a plurality of predetermined classes. One of the classes is assigned to each pixel of the image based on the respective probability values to create a predicted segmentation map. For training the neural network, a loss function is generated by relating the predicted segmentation map to ground truth labels. Furthermore, an edge detection algorithm is applied to at least one of the predicted segmentation maps and the ground truth labels, wherein the edge detection algorithm predicts boundaries between objects. Generating the loss function is based on a result of the edge detection algorithm.

17 Claims, 7 Drawing Sheets

(51) Int. Cl.
*G06T 7/13* (2017.01)
*G06T 7/62* (2017.01)
*G06V 10/26* (2022.01)
*G06V 10/764* (2022.01)
*G06V 10/774* (2022.01)
*G06V 10/82* (2022.01)
*G06V 20/58* (2022.01)

(52) U.S. Cl.
CPC ............ *G06V 10/26* (2022.01); *G06V 10/764* (2022.01); *G06V 10/7747* (2022.01); *G06V 10/82* (2022.01); *G06T 2207/20021* (2013.01); *G06T 2207/20081* (2013.01); *G06T 2207/20084* (2013.01); *G06T 2207/30261* (2013.01); *G06V 20/58* (2022.01)

(58) Field of Classification Search
CPC .... G06V 10/443; G06V 10/454; G06V 20/56; G06T 7/12; G06T 7/13; G06T 7/62; G06T 2207/20021; G06T 2207/20081; G06T 2207/20084; G06T 2207/30261; G06T 7/11; G06T 2207/10004; G06F 18/2413; G06F 18/241
See application file for complete search history.

(56) References Cited

U.S. PATENT DOCUMENTS

| | | | |
|---|---|---|---|
| 2015/0206319 | A1 | 7/2015 | Dollar et al. |
| 2016/0217335 | A1 | 7/2016 | Levi et al. |
| 2017/0169313 | A1 | 6/2017 | Choi et al. |
| 2017/0287137 | A1 | 10/2017 | Lin et al. |
| 2018/0253622 | A1* | 9/2018 | Chen .................. G06N 3/08 |

FOREIGN PATENT DOCUMENTS

| | | |
|---|---|---|
| CN | 112070779 A | 12/2020 |
| EP | 3474189 A1 | 4/2019 |

OTHER PUBLICATIONS

"Extended European Search Report", EP Application No. 21154378.0, Jul. 22, 2021, 10 pages.
"Foreign Office Action", EP Application No. 17196983.5, Feb. 8, 2021, 4 pages.
"Non-Final Office Action", U.S. Appl. No. 16/143,741, filed Apr. 8, 2020, 23 pages.
"Notice of Allowance", U.S. Appl. No. 16/143,741, filed Aug. 26, 2020, 16 pages.
"Notice of Allowance", U.S. Appl. No. 16/143,741, filed Oct. 13, 2020, 20 pages.
Alberto Garcia-Garcia, et al.: "A Review on Deep Learning Techniques Applied to Semantic Segmentation" Apr. 22, 2017, 23 pages.
Andres Milioto, et al.: "RangeNet ++: Fast and Accurate LiDAR Semantic Segmentation", 2019 IEEE/RSJ International Conference on Intelligent Robots and Systems (IROS), Nov. 2019, 8 pages.
Andrew Tao, et al.: "Hierarchical Multi-Scale Attention for Semantic Segmentation", May 21, 2020, 11 pages.
Do Freeman: "Using Continuous Graphical Models to Structure and Improve Disparity Estimations", Sep. 10, 2016, 35 pages.
Jonathan Long, et al.: "Fully Convolutional Networks for Semantic Segmentation", Nov. 14, 2014, 10 pages.
Liang-Chieh Chen, et al.: "DeepLab: Semantic Image Segmentation with Deep Convolutional Nets, Atrous Convolution, and Fully Connected CRFs", Jun. 2, 2016, 14 pages.
Marius Cordts, et al.: "The Cityscapes Dataset for Semantic Urban Scene Understanding", Apr. 6, 2016, 29 pages.
Nick Kanopoulos, et al.: "Design of an Image Edge Detection Filter Using the Sobel Operator", IEEE Journal of Solid-State Circuits, vol. 23, Issue: 2, Apr. 1988, 10 pages.
Philipp Krähenbühl, et al.: "Efficient Inference in Fully Connected CRFs with Gaussian Edge Potentials", Oct. 20, 2012, 9 pages.
Roland S. Zimmermann, et al. "Faster Training of Mask R-CNN by Focusing on Instance Boundaries", Sep. 19, 2018, 10 pages.
Shuai Zheng, et al.: "Conditional Random Fields as Recurrent Neural Networks", Feb. 11, 2015, 17 pages.
Shuo Liu, et al., "ERN: Edge Loss Reinforced Semantic Segmentation Network for Remote Sensing Images", Aug. 22, 2018, 23 pages.
Song Yuheng, et al.: "Image Segmentation Algorithms Overview", Jul. 7, 2017, 6 pages.
Tsung-Yi Lin, et al.: "Focal Loss for Dense Object Detection", Aug. 7, 2017, 10 pages.
Vijay Badrinarayanan, et al.: "SegNet: A Deep Convolutional Encoder-Decoder Architecture for Image Segmentation", Oct. 10, 2016, 14 pages.
Yuqi Li, et al., "Edge-guided Hierarchically Nested Network for Real-time Semantic Segmentation", Sep. 2019, 6 pages.
"Foreign Office Action", CN Application No. 201811201101.X, Aug. 22, 2022, 11 pages.
"Foreign Office Action", EP Application No. 17196983.5, Aug. 4, 2022, 5 pages.

\* cited by examiner

Fig. 5
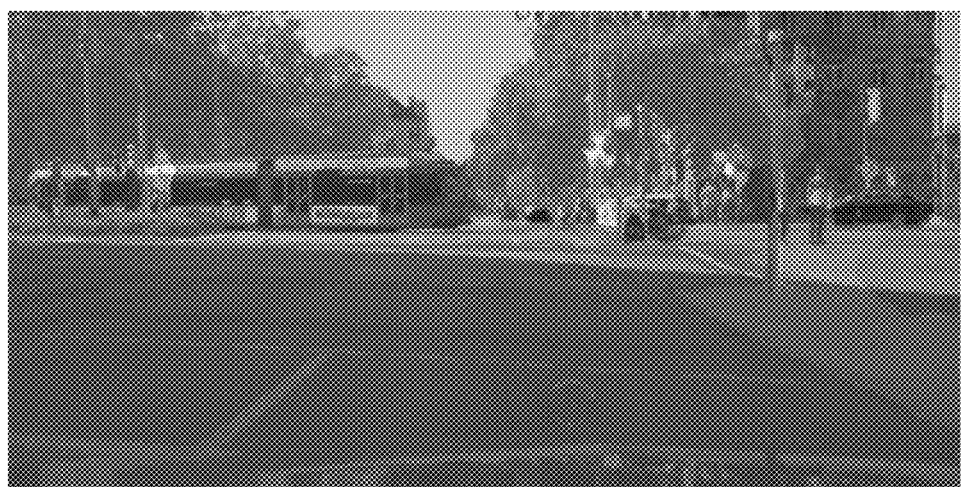
Background art
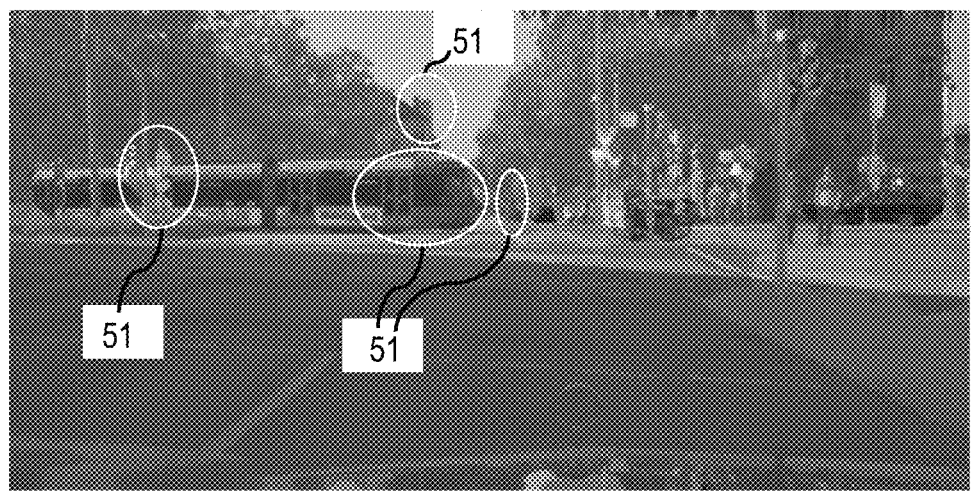
Method according to the disclosure

Fig. 6
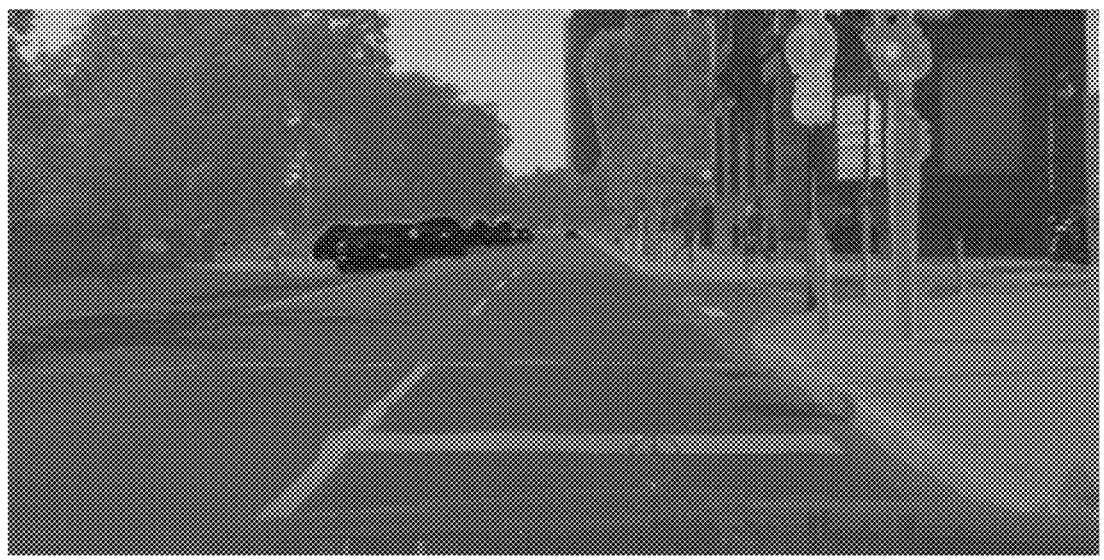
Background art
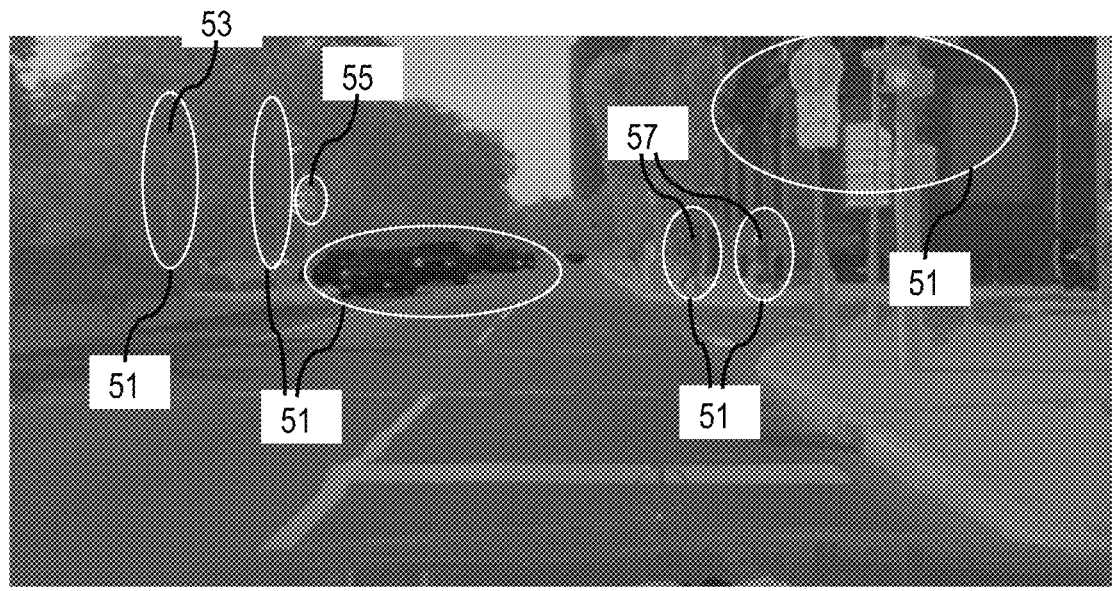
Method according to the disclosure

METHOD AND DEVICE FOR CLASSIFYING PIXELS OF AN IMAGE

CROSS-REFERENCE OF RELATED APPLICATIONS

This application claims priority to European Patent Application Number 21154378.0, filed Jan. 29, 2021, the disclosure of which is hereby incorporated by reference in its entirety herein.

BACKGROUND

The present disclosure relates to methods and devices performing a semantic segmentation by classifying a plurality of pixels of an image. For autonomous driving and driver assistance systems, it is essential to have a reliable perception of the environment of a vehicle. One important basis for the perception of the environment is semantic segmentation, i.e., classifying objects in the environment and determining areas e.g., in an image of the environment which are occupied by a certain object type or object class.

For the semantic segmentation, usually a plurality of predetermined classes is defined for the objects which may occur in an image of the environment. For example, the predetermined classes may include a respective class for other vehicles, for pedestrians, for the road, for buildings, etc. The semantic segmentation may further be performed for pixels of an image of the environment. That is, each pixel of the image is assigned to one of the predetermined classes.

Nowadays, convolutional neural networks (CNNs) are mostly used for the task of semantic segmentation. CNNs are a special type of neural networks which are configured to mimic the human visual processing system from the eye to the visual cortex. A CNN includes an arbitrary number of consecutive layers which are trained together to fulfill a given task, i.e., in the present case the classification of objects represented by the pixels of the image which are each assigned to one of the predetermined classes.

For training any neural network, it is essential to have a reliable loss function to achieve a desired certainty for the network's output. The loss function includes a certain comparison between the output or prediction of the neural network and the desired output which is also referred to as ground truth labels. During training the neural network, a regression is performed by assigning large loss values to undesired output data and by minimizing the total loss.

In case of semantic segmentation for a large number of pixels within an image, the total loss is usually estimated as the mean value over the loss values of all pixels. Therefore, the proportional contribution of an individual pixel to the total loss is small. As a consequence, regions in the image which are more challenging for classification, e.g., object boundaries, are weighted by their size instead of their importance. A trained neural network might therefore wrongly classify the pixels of such small objects and object boundaries when running in a live in-vehicle system.

Accordingly, there is a need for a method and a device which can provide a reliable semantic segmentation for small objects and for object boundaries.

SUMMARY

The present disclosure provides a computer implemented method, a computer system and a non-transitory computer readable medium according to the independent claims. Embodiments are given in the subclaims, the description and the drawings.

In one aspect, the present disclosure is directed at a computer implemented method for classifying pixels of an image. According to the method, an image captured by a sensor device is received, wherein the image comprises a plurality of pixels. A neural network implemented on a processing device is used for estimating probability values for each pixel, wherein each probability value indicates the probability for the respective pixel being associated with one of a plurality of predetermined classes. One class of the plurality of predetermined classes is assigned to each pixel of the image based on the respective probability values for each pixel to create a predicted segmentation map for the image. For training the neural network, a loss function is generated by relating the predicted segmentation map to ground truth labels. Furthermore, an edge detection algorithm is applied to at least one of the predicted segmentation maps and the ground truth labels, wherein the edge detection algorithm predicts boundaries between objects in the predicted segmentation map and in the ground truth labels. Generating the loss function is based on a result of the edge detection algorithm.

The sensor device may include a camera and/or a Lidar system. Therefore, the term "image" generally refers to the output of the sensor device and may comprise a two-dimensional or a three-dimensional matrix including a respective plurality of pixels.

The plurality of predetermined classes refers to the types of objects which are expected to be seen in the image. Each class may be represented by an indicator which may be assigned to the respective pixels of the image. For automotive applications, the classes may comprise "other vehicle", "pedestrian", "road", "building", etc.

The ground truth labels refer to images for which the type of the respective object is known for each pixel. That is, the ground truth labels represent the desired output of the neural network and of the entire method. Therefore, the predictions of the neural network and the ground truth labels are compared during the training of the neural network, and the deviation between the prediction and the ground truth labels is quantified via the loss function which is therefore to be minimized.

The edge detection algorithm may be based e.g. on a Sobel operator for extracting boundaries between objects belonging to different classes. Since the result of the edge detection algorithm is incorporated into the definition or generation of the loss function, the contribution of object boundaries to the loss function is strongly enhanced. Therefore, the contribution of small objects is enhanced as well since their fraction of pixels belonging to the boundaries related to their total number of pixels is greater in comparison to large objects.

In total, the neural network is trained with an emphasis on small objects and object boundaries within the image since the result of the edge detection algorithm is considered when generating the loss function. Due to this, the entire semantic segmentation or classification of the pixels within the image is improved by the method according to the disclosure. For automotive applications of the method, it helps to prevent that small objects and object boundaries are overlooked or assessed in an erroneous manner. Hence, the method may improve safety if semantic segmentation is used within the framework of autonomous driving or driver assistance systems.

The method may comprise one or more of the following features: The edge detection algorithm may be applied to the predicted segmentation map only. Alternatively, the edge detection algorithm may be applied to the ground truth labels only, or the edge detection algorithm may be applied to both predicted segmentation map and the ground truth labels. A result of applying the edge detection algorithm to the predicted segmentation map and a result of applying the edge detection algorithm to the ground truth labels may be merged by selecting the maximum value of the respective results for each pixel.

The result of the edge detection algorithm may be applied to the result of relating the predicted segmentation map to the ground truth labels for generating the loss function. Furthermore, the result of the edge detection algorithm may be a mask which covers the pixels of the predicted boundaries. The mask may include a respective element for each pixel, a loss matrix including an element for each pixel may be calculated by relating the predicted segmentation map to the ground truth labels, and each element of the mask may be multiplied by the corresponding element of the loss matrix for each pixel when generating the loss function. The elements of the mask whose pixels are outside the predicted boundaries may be assigned a value close to zero.

The edge detection algorithm may include a Sobel operator comprising two predefined convolutional kernels and two additional kernels which are generated by rotating the two predefined convolutional kernels. The edge detection algorithm may include a consequential convolutional kernel for increasing the width of the predicted boundaries between objects. The additional convolutional kernel may be a bivariate Gaussian kernel.

According to an embodiment, the edge detection algorithm may be applied to the predicted segmentation map only. Alternatively, the edge detection algorithm may be applied to the ground truth labels only. By considering either the predicted segmentation map or the ground truth labels when applying the edge detection algorithm, the computational effort is reduced which is required for generating the loss function based on the result of the edge detection algorithm. If the predicted segmentation map is taken into account, wrongly classified, "hallucinated" objects may be suppressed in the training of the neural network since their weights within the loss function may be increased and there may be no corresponding objects within the ground truth labels. Hence, minimizing the total loss during training of the neural network may lead to the suppression of the hallucinated objects. On the other hand, if the ground truth labels are considered by the edge detection algorithm only, it is ensured that most important objects are respected in the loss function, i.e., irrespective of their predicted classification via the neural network.

According to a further embodiment, the edge detection algorithm may be applied to both predicted segmentation map and the ground truth labels. For this embodiment, the advantages of both embodiments described before are valid, i.e., suppression of "hallucinated" objects and proper consideration of the most important objects. The same edge detection algorithm may be applied to the prediction segmentation map and to the ground truth labels to generate the final result of the edge detection algorithm. By considering the ground truth labels in addition to the predicted segmentation map when performing the edge detection, even objects which are missed by the model underlying the neural network and which are therefore missing in the predicted segmentation map may be emphasized.

A result of applying the edge detection algorithm to the predicted segmentation map and a result of applying the edge detection algorithm to the ground truth labels may be merged by selecting the maximum value of the respective results for each pixel. That is, the final result of the edge detection may be generated by applying a pixel-wise maximum operator to the separate results of applying the edge detection algorithm to the prediction and to the ground truth. In comparison to an arithmetical merging, the final result of the edge detection may be improved.

The result of the edge detection algorithm may be applied to the result of relating the predicted segmentation map to the ground truth labels for generating the loss function. In detail, a "preliminary loss" may be estimated by the relation of the predicted segmentation map and the ground truth labels, e.g., by applying a cross-entropy loss function. Thereafter, the result of the edge detection algorithm may be applied to the preliminary loss for estimating the final loss function to increase the contribution of small objects and object boundaries. In other words, the contribution of the boundaries between the objects may be enhanced since all pixels which do not belong to the boundaries are suppressed.

The result of the edge detection algorithm may be a mask which covers the pixels of the predicted boundaries. The mask may include a respective element for each pixel, a loss matrix including an element for each pixel may be calculated by relating the predicted segmentation map to the ground truth labels, and each element of the mask may be multiplied by the corresponding element of the loss matrix for each pixel when generating the loss function. On the other hand, the elements of the mask whose pixels are outside the detected boundaries may be assigned a value close to zero. In detail, the mask may comprise values between zero and one. If a pixel belongs to a boundary between objects, the element of the mask for this pixel may be assigned a value of one or close to one, whereas the pixels which do not belong to the boundaries between objects may be assigned a small value of e.g., 0.1. Such a small value close to zero may ensure that all pixels are accounted for when generating the loss function. However, the contribution of the pixels not belonging to the boundaries between objects may be strongly suppressed.

According to a further embodiment, the edge detection algorithm may include a Sobel operator comprising two predefined convolutional kernels and two additional kernels which are generated by rotating the two predefined convolutional kernels. The Sobel operator is per se a well-known means for edge detection and usually has two predefined and constant convolutional kernels. However, it turned out that the standard Sobel kernels do not provide good results for the detection of diagonal edges or boundaries between objects. Therefore, two additional convolutional kernels may be included in the edge detection algorithm which are rotated versions of the original Sobel kernels. For example, the original Sobel kernels may be rotated by +/−45°. By this means, the result of the edge detection algorithm may be improved in comparison to a applying the original Sobel operator only.

Furthermore, the edge detection algorithm may include a consequential convolutional kernel for increasing the width of the predicted boundaries between objects. The additional convolutional kernel may be a bivariate Gaussian kernel. The additional kernel may also be called a padding kernel since it may add e.g., a padding of three pixels before and of three pixels after an original line representing a boundary between objects. By increasing the width of the boundaries between objects, a successful learning of the neural network may be supported since it turned out that the result of the edge detection algorithm may provide too narrow boundaries between objects if it may be performed without padding. The bivariate Gaussian kernel may be a convenient representation of such a padding kernel. In detail, the bivariate Gaussian kernel used by the method may be normalized such that the mean value over all its elements may be one.

In another aspect, the present disclosure is directed at a system for classifying pixels of an image. The system comprises a sensor device configured to capture an image including a plurality of pixels, and a processing device. The processing device is configured to receive the image from the sensor device, to implement a neural network to be used for estimating probability values for each pixel, wherein each probability value indicates the probability for the respective pixel being associated with one of a plurality of predetermined classes. The processing device is further configured to assign one of the plurality of predetermined classes to each pixel of the image based on the respective probability values for each pixel in order to create a predicted segmentation map for the image, to generate a loss function for training the neural network by relating the predicted segmentation map to ground truth labels, and to apply an edge detection algorithm at least one of the predicted segmentation map and the ground truth labels, wherein the edge detection algorithm predicts boundaries between objects in the predicted segmentation map and in the ground truth labels. Generating the loss function is based on a result of the edge detection algorithm.

As used herein, the terms processing device, processing unit and module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

In summary, the system according to the disclosure includes a sensor device, e.g., a camera and/or a Lidar system, and a processing device which are configured to perform the steps as described above for the corresponding method. Therefore, the benefits, the advantages and the disclosure as described above for the method are also valid for the system according to the disclosure.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid-state drive (SSD); a read only memory (ROM); a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
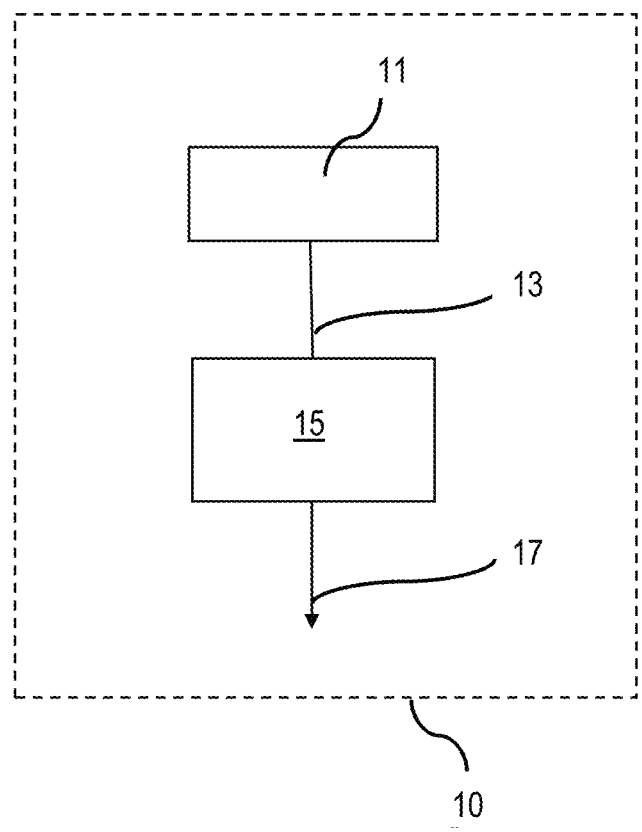
FIG. 1 depicts a high-level diagram of a system according to the disclosure.

FIG. 1 schematically depicts a high-level diagram of a system 10 for classifying pixels of an image, i.e., for performing a semantic segmentation of the picture. The system includes a camera 11 as a sensor device and processing device 15. The camera 11 is mounted to a vehicle and can capture an image 13 of the environment of the vehicle, e.g., in front of the vehicle. Alternatively, a Lidar system may be used for capturing the image 13 which may be in this case a three-dimensional matrix of pixels.

The image 13 captured by the camera 11 is used as an input for the processing device 15 which is configured to generate a convolutional neural network 33 (see FIG. 3) for performing the semantic segmentation of the image 13. For the semantic segmentation, the processing device 15 uses a method 31 which will be described in context of FIG. 3 below. The output of the processing device 15, i.e., a semantic segmentation 17 of the picture 13, is provided as an input for further devices of the vehicle which are part e.g., of a driver assistance system.

Figure 2:
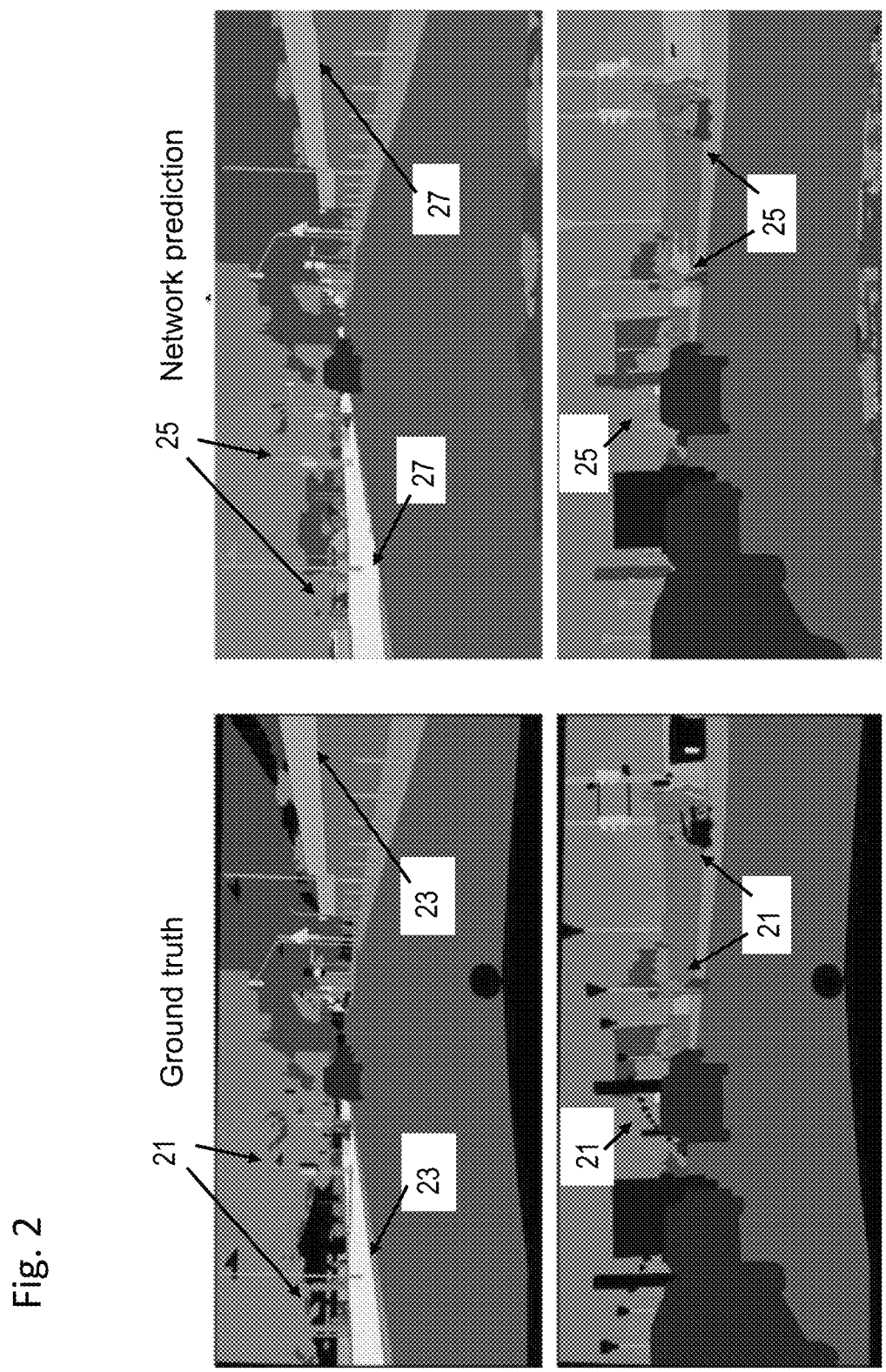
FIG. 2 depicts results of a semantic segmentation according to the background art.

FIG. 2 depicts results of a semantic segmentation according to the background art. That is, areas within pictures 13 captured by the camera 11 are assigned to predefined types of objects or object class, e.g., to one of the object classes "other passenger car", "truck", "road", "sidewalk", "pedestrian", etc. The area occupied by a certain object type is represented by a unique color in FIG. 2.

On the left side of FIG. 2, ground truth labels are shown for two different scenes. For these scenes, it is known which area belongs to which object type. The ground truth labels depicted on the left side of FIG. 2 are used for training a convolutional neural network which provides a network prediction shown on the right side, respectively, of FIG. 2 for the semantic segmentation of the images 13. In detail, the semantic segmentation or classification of objects is performed based on pixels of the respective image 13. For example, each image 13 includes r=2048 rows and c=1024 columns, i.e., almost 2.1 million of pixels. For each pixel, the convolutional neural network provides a prediction regarding the object class, i.e., it assigns an indicator for a certain object class to each pixel. Therefore, each area as shown on the left side of FIG. 2 and having a certain color includes a plurality of pixels which are classified as a certain type of object by the convolutional neural network.

As can be recognized on the left side of FIG. 2, the respective ground truth labels for the pictures 13 include many small objects 21 and boundaries 23 between objects. As can be seen on the right side of FIG. 2, the respective network prediction according to the background art fails to classify the small objects 21 and the boundaries 23 properly. In detail, in the areas designated by 25 the small objects 21 are missing or almost missing. In addition, the sharp boundaries 23 between the objects as shown on the left side of FIG. 2 are also not properly recognizable in the network prediction, as is indicated by 27. The sharp boundary 23 between the objects appears to be corrupted in the output of the convolutional neural network.

A reason for the erroneous or not satisfying classification by the network prediction according to the background art is related to a loss function which is usually used for training the convolutional neural network. A robust loss function is generally essential for a learning or training process of any neural network. The loss function generally includes a certain comparison of a predicted output of the neural network and a desired output, i.e., the ground truth labels. Typically, a regression is performed by assigning large loss values to undesired values within the network prediction, and the total loss is minimized thereafter during training of the neural network.

For evaluating the output or prediction of a neural network, a so-called cross-entropy function is commonly used as a loss function and defined as $$\text{loss} = -\Sigma_{i=0}^{n} y_i * \log(\hat{y}_i) \quad (1)$$

wherein $y_i$ represents the output or prediction of the neural network, whereas $\hat{y}_i$ represents the desired or ground truth label. The total loss is then defined as the mean over all pixels within the image 13. Since for an image having 2048 rows and 1024 columns and therefore almost 2.1 million of pixels, the contribution of a single pixel to the loss function or total loss is approximately weighted by $1/(2.1*10^6)$. As a consequence, small objects and boundaries between objects which include quite a small number of pixels are not properly represented in the loss function according to the background art in which all pixels have the same weight for their contribution to the loss function. Therefore, it is desirable to have a loss function for training the convolutional neural network in which the representation of small objects and boundaries between objects is improved.

Figure 3:
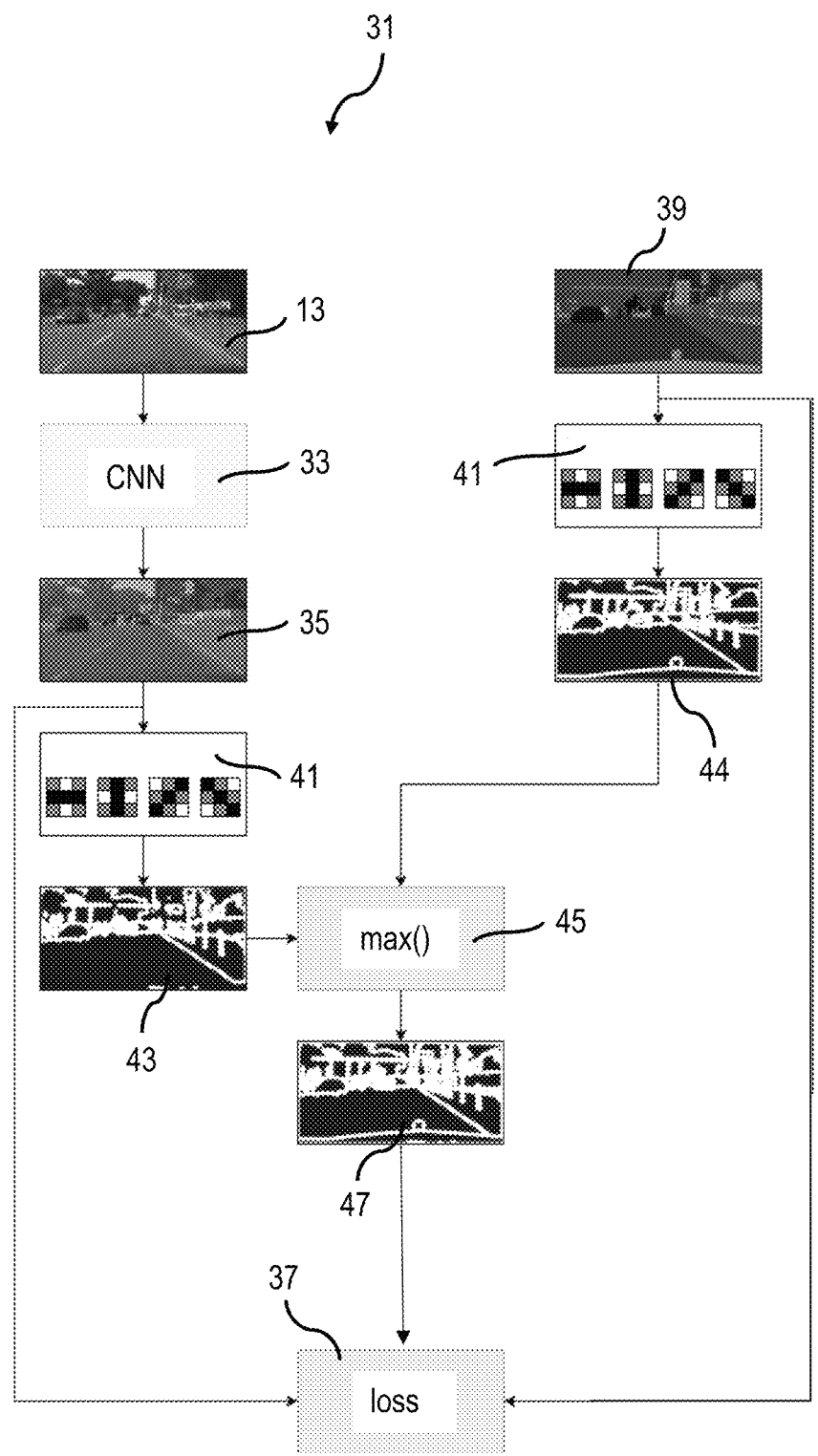
FIG. 3 depicts a flow diagram for a method according to the disclosure.

FIG. 3 depicts a flow diagram for a method 31 according to the disclosure. The method 31 is provided for classifying pixels of the image 13 which is captured by the camera 11 (see FIG. 1). That is, the image 13 including a plurality of pixels is provided as input for the method, i.e., for a convolutional neural network 33 which is generated by the processing device 15 (see FIG. 1). The convolutional neural network 33 (see FIG. 3) includes a plurality of layers which are based on an underlying model.

The neural network 33 estimates probability values for each pixel. Each probability value indicates a probability for the respective pixel for being associated with one of a plurality of predetermined classes. Based on the respective probability values for each pixel, each pixel of the image 13 is assigned to one class of the plurality of classes, i.e., by selecting the class having the highest probability value. The predetermined classes include predetermined types of objects visible for the camera 11, i.e., other vehicles, the road, the sidewalk, pedestrians, etc. As an output, the convolutional neural network 33 creates a predicted segmentation map 35 which includes a predicted class for each pixel. In the predicted segmentation map 35 as shown in FIG. 3 and in similar predicted segmentation maps as shown in FIGS. 5 and 6, different types of objects are represented by different colors.

In order to train the neural network 33, the predicted segmentation map 35 is related to ground truth labels 39, i.e., the desired output of the convolutional neural network 33. For the ground truth labels 39, the correct assignment to the respective class or object type is known for each pixel of the image 13. The predicted segmentation map 35 is related to ground truth labels 39 via a loss function 37 which is based on the cross-entropy function as described above in context of FIG. 2. During training of the convolutional neural network 33, a total loss provided by the loss function 37 is to be minimized.

As mentioned above, the commonly used loss function which is based on the cross-entropy function as the disadvantage that the contribution of all pixels is the same which leads to an underestimation of small objects and object boundaries when estimating the loss function and therefore to an erroneous or missing classification of the small objects and the object boundaries.

In order to overcome this disadvantage, the method includes providing a modified version 37 of the loss function in which the small objects and object boundaries are provided with a greater weight in order to increase their contribution to the total loss.

In order to increase the contribution of small objects and object boundaries to the loss function 37, an edge detection algorithm 41 is applied to the predicted segmentation map 35 and to the ground truth labels 39. The output of the edge detection algorithm 41 is a prediction mask 43 when applied to the predicted segmentation map 35, and a ground truth map 44 when applied to the ground truth labels 39. Within the masks 43, 44, all boundaries between objects are highlighted in FIG. 3 since the masks assign much higher weights to the pixels of the detected boundaries or edges than to the pixels which do not belong to the boundaries.

The edge detection algorithm 41 is based on a so-called Sobel operator which can extract boundaries between the predicted classes. The standard Sobel operator includes two predefined and constant convolutional kernels:

$$s_y = \begin{bmatrix} 1 & 2 & 1 \\ 0 & 0 & 0 \\ -1 & -2 & -1 \end{bmatrix}, s_x = \begin{bmatrix} 1 & 0 & -1 \\ 2 & 0 & -2 \\ 1 & 0 & -1 \end{bmatrix} \quad (2)$$

By using these kernels, color gradients in the image 13 can be detected.

However, it turned out that a standard Sobel operator based on the predefined constant convolutional kernels is not sufficient for successfully weighting the loss function 37. In detail, the Sobel kernels as defined in (2) show a minor performance when trying to detect diagonal edges. Therefore, two additional convolutional kernels have been added for which the original Sobel kernels are rotated by +/−45°.

In addition, the pixels not belonging to the detected edges are suppressed by setting their value close to zero in the mask. Therefore, almost no loss values are assigned to a major portion in the predicted segmentation map 35 to create the masks 43, 44. However, since a prediction is still to be provided for all pixels of the image 13, all pixels in the respective mask 43 or 44 have at least a small value of e.g., 0.1 to account for loss values of all pixels.

Moreover, it turned out that the resulting edges provided by the edge detection algorithm 41 so far are not sufficient to support a successful learning or training of the convolutional network 33. Hence, a consequential convolutional kernel is applied which is a bivariate Gaussian kernel having a predefined size. In detail, a 3×3 padding kernel is used which is given by $$k_p = \begin{bmatrix} 0.0625 & 0.125 & 0.0625 \\ 0.125 & 0.25 & 0.125 \\ 0.0625 & 0.125 & 0.0625 \end{bmatrix} \quad (3)$$

When the convolution is performed within the edge detection algorithm 41, the additional kernel adds a padding of three pixels before and of three pixels after the original line or boundary between respective objects. Therefore, the widths of the boundaries as represented in the masks 43, 44 are increased. In practice, additional padding kernels of roughly 30×30 pixels are used. In contrast to the classical Gaussian kernel which is normalized such that the sum over all its elements is equal to one, the method according to the disclosure normalizes the bivariate Gaussian kernel such that the mean value over its elements is one.

After a respective mask 43, 44 is generated based on the modified or extended Sobel operator including additional kernels, the two masks 43, 44 are merged by using a pixel-wise maximum operator at 45. That is, for each pixel the greater value of the respective masks 43, 44 is selected to generate a final or merged mask 47. For each pixel, the final mask 47 is included in the generation of the loss function 37. That is, for each pixel the contribution to the loss is calculated according to the cross-entropy function as defined in (1) such that a "preliminary loss" or loss matrix is generated for which each element includes the contribution of the respective pixel. Thereafter, the final mask 47 is applied to the preliminary loss or loss matrix. In detail, for each pixel the preliminary loss is multiplied by the corresponding element of the final mask 47. Due to this, object boundaries and small objects have a greater contribution to the loss function 37 than areas which do not belong to the detected boundaries between objects.

According to the embodiment as shown in FIG. 3, the method includes generating the prediction mask 43 for which the edge detection algorithm 41 is applied to the prediction segmentation map 35, generating the ground truth mask 44 for which the edge detection algorithm 41 is applied to ground truth labels 39, and generating the final mask 47 for which both masks 43, 44 are merged and which is applied when generating the loss function 37. For another embodiment, however, the prediction mask 43 is applied to the ground truth labels 39 only. That is, the final mask 47 is identical with the prediction mask 43 for this embodiment since no merging of the two masks 43, 44 is performed. For an alternative embodiment, the ground truth mask 44 is used only to generate the final mask 47, i.e., the prediction mask 43 is omitted and no merging of the two masks 43, 44 is performed. In other words, the ground truth mask 44 is applied directly to the loss function 37, i.e., to the preliminary loss, for this alternative embodiment.

Figure 4A:
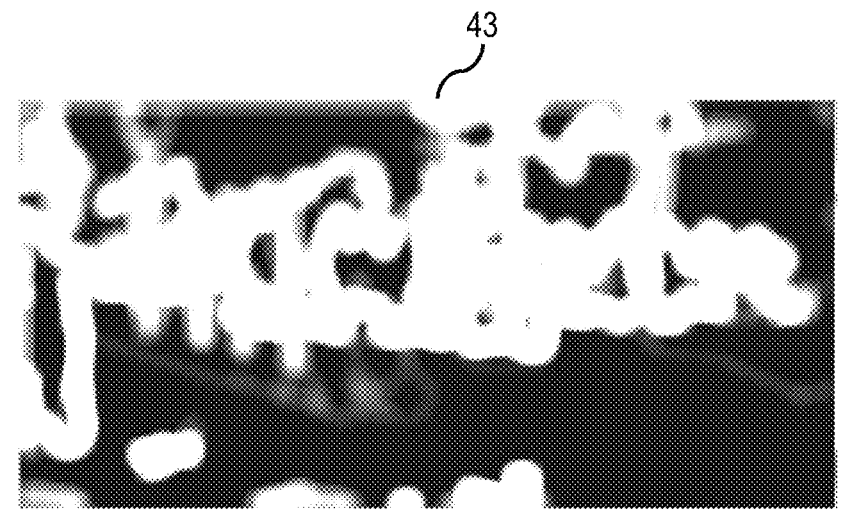
FIGS. 4A-4C depict edge detection results and their application to ground truth labels, FIGS. 5 and 6 compare a respective semantic segmentation based on background art and based on the method according to the disclosure.
Figure 4B:

FIG. 4A depicts an enlarged example for the prediction mask 43. FIG. 4B depicts the result for applying the prediction mask 43 from FIG. 4A to the ground truth labels 39. By using the prediction mask 43, wrongly classified or "hallucinated" objects may be suppressed. Such a hallucinated object can be recognized in the bottom left corner of FIG. 4B. Since the weight or contribution of this hallucinated object is increased due to the prediction mask 43 when calculating the total loss, such objects will be suppressed by the trained neural network after the minimization of the loss function during the training. In addition, FIG. 4B also represents the masked ground truth labels for the embodiment of the method for which the prediction mask 43 is considered for generating the loss function 37 only.

Figure 4C:

In contrast, FIG. 4C depicts the masked ground truth labels for which the merged final mask 47 has been applied to the original ground truth labels 39. That is, FIG. 4C represents the masked ground truth labels for the embodiment as shown in FIG. 3 for which the final mask 47 is generated by merging both masks 43, 44. By taking the ground truth mask 44 additionally into account, it is ensured that the most important parts of the image are properly respected. As can be seen in the upper right corner of FIG. 4C, the contribution of the boundaries which belong to a pink element 50 is strongly enhanced since the ground truth mask 44 is additionally considered. Weights for the pink element 50 are almost missing in the prediction mask 43 as can be recognized in the upper right corner of FIG. 4A.

It is noted that the prediction mask 43 as shown in FIG. 4A and the merged final mask 47 (see FIG. 3) are applied to or multiplied by the ground truth labels 39 for illustration purposes only, i.e., for demonstrating the effect of the masks 43, 47 on individual objects within the image 13. For generating the loss function 37 and estimating the total loss, however, the masks are applied to (or multiplied by) the "preliminary loss", i.e., the loss matrix which is calculated based on the cross-entropy function, but not to the ground truth labels 39 directly.

FIGS. 5 and 6 depict a comparison of the semantic segmentation for a respective image performed by a method according to the background art (upper part of FIGS. 5 and 6) and performed by a method according to the disclosure (lower part of FIGS. 5 and 6). As can be seen in the encircled regions 51, the boundaries between the objects are much clearer in the segmentation result for the method according to the disclosure. In addition, some small objects are almost completely classified in a wrong manner by the method according to the background art. For example, the pole on the right side in the image of FIG. 6 cannot be recognized in the segmentation result according to the background art, whereas is clearly comes out when the segmentation is performed by the method according to the disclosure. The same holds true for the traffic lights as shown at 55. In addition, the recognition of pedestrians 57 is improved by the method according to the disclosure, as can be seen on the right side of FIG. 6.

The improved segmentation results as shown on the respective lower part of FIGS. 5 and 6 are due to the fact that the edge detection algorithm 41 (see FIG. 3) is incorporated into the method 31 when generating the loss function 37. Since the result of the edge detection algorithm 41 is applied to the ground truth labels 39 before relating the predicted segmentation map 35 to the ground truth labels 39 via the loss function 37, the contribution of object boundaries and small objects to the loss function 37 is enhanced during the training procedure of the neural network 33. Since small objects and object boundaries are better recognizable in the semantic segmentation results as shown in FIGS. 5 and 6 (respective lower part), the safety for a vehicle may be improved if the method according to the disclosure is applied e.g., in connection with driver assistance systems and autonomous driving.

For a detailed validation of the segmentation results, a so-called border intersection over union (border IoU) has been estimated. The border IoU is defined and applied e.g., in Milioto, A. et al.: "RangeNet++: Fast and accurate LiDAR semantic segmentation", 2019 IEEE/RSJ International Conference on Intelligent Robots and Systems (IROS), pp. 42134220. IEEE, 2019. The intersection over union (IOU) is commonly used for describing a similarity of sets, vectors and objects. In semantic segmentation, the IoU is generally used as a metric to assess the labeling performance which relates the true positives of a network prediction to the sum over true positive, false positive and false negative predictions of the neural network. For the border IoU, this assessment key is applied to boundaries between objects only.

Figure 7A:
FIGS. 7A-7C depict a visualization of a validation of the semantic segmentation including a border intersection over union and its complement.
Figure 7B:
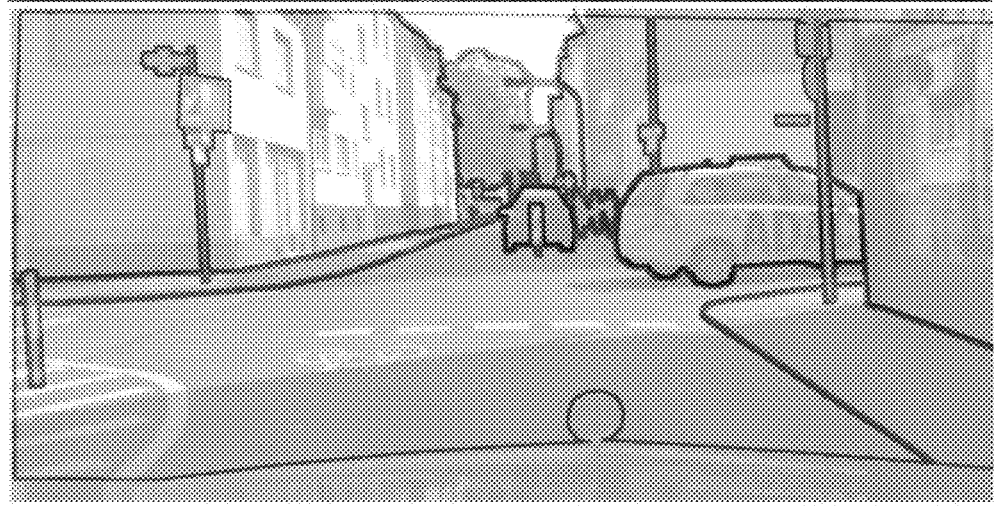
Figure 7C:
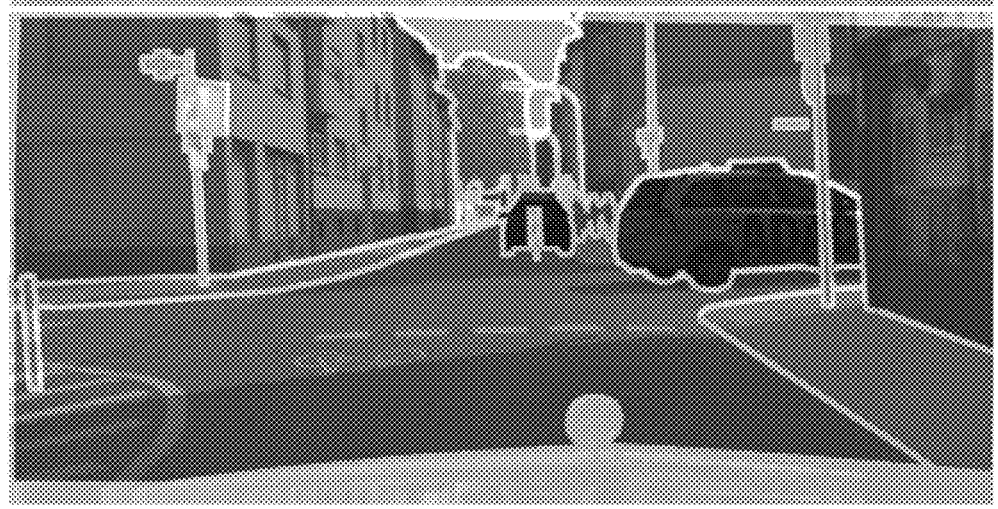

This is visualized in FIG. 7. FIG. 7A depicts an original picture 13 captured by the camera 11 (see FIG. 1) being installed in a vehicle. FIG. 7B depicts the border IoU wherein the evaluated pixels of the image 13 are masked with their respective color which is assigned to the respective object class. In FIG. 7C a so-called interior IoU is depicted which is evaluated as the complement of the border IoU shown in FIG. 7B. For almost all object classes, it turned out that all metrics, i.e., the "normal" IoU, the interior IoU and especially the border IOU, provided better values for the semantic segmentation based on the method according to the disclosure in comparison to the semantic segmentation based on the method according to the background art.

What is claimed is:

1. A computer-implemented method comprising:
receiving an image captured by a sensor device, the image comprising a plurality of pixels;
estimating, using a neural network implemented on a processing device, a respective probability value for each pixel of the plurality of pixels, wherein each respective probability value indicates a probability for a respective pixel being associated with one of a plurality of predetermined classes;
assigning one of the plurality of predetermined classes to each pixel of the image based on the respective probability value for each pixel to create a predicted segmentation map for the image;
generating a loss function for training the neural network by relating the predicted segmentation map to ground truth labels; and
applying an edge detection algorithm to at least one of the predicted segmentation map and the ground truth labels, the edge detection algorithm predicting boundaries between objects in the predicted segmentation map and the ground truth labels, generation of the loss function being based on a result of the edge detection algorithm;
wherein:
the result of the edge detection algorithm is a mask that covers pixels of the predicted boundaries;
the mask includes a respective element for each pixel;
a loss matrix including a matrix element for each pixel is calculated by relating the predicted segmentation map to the ground truth labels; and
each element of the mask is multiplied by the corresponding matrix element of the loss matrix for each pixel when generating the loss function.

2. The method of claim 1, wherein the edge detection algorithm is applied to the predicted segmentation map only.

3. The method of claim 1, wherein the edge detection algorithm is applied to the ground truth labels only.

4. The method of claim 1, wherein the edge detection algorithm is applied to the predicted segmentation map and the ground truth labels.

5. The method of claim 4, wherein a result of applying the edge detection algorithm to the predicted segmentation map and a result of applying the edge detection algorithm to the ground truth labels are merged by selecting a maximum value of the respective results for each pixel.

6. The method of claim 1, wherein the result of the edge detection algorithm is applied to a result of relating the predicted segmentation map to the ground truth labels for generating the loss function.

7. The method of claim 1, wherein the elements of the mask whose pixels are outside the predicted boundaries are assigned a value equal to or about equal to zero.

8. The method of claim 1, wherein the edge detection algorithm includes a Sobel operator comprising two predefined convolutional kernels and two additional kernels which are generated by rotating the two predefined convolutional kernels.

9. The method of claim 8, wherein the edge detection algorithm includes a consequential convolutional kernel for increasing a width of the predicted boundaries between objects.

10. The method of claim 9, wherein the additional convolutional kernel is a bivariate Gaussian kernel.

11. A system comprising:
a sensor device configured to capture an image comprising a plurality of pixels; and
a processing device configured to:
receive the image from the sensor device;
implement a neural network to estimate a respective probability value for each pixel, each respective probability value indicating a probability for a respective pixel being associated with one of a plurality of predetermined classes;
assign one of the plurality of pre-determined classes to each pixel of the image based on the respective probability values for each pixel to create a predicted segmentation map for the image;
generate a loss function for training the neural network by relating the predicted segmentation map to ground truth labels; and
apply an edge detection algorithm to at least one of the predicted segmentation map and the ground truth labels, the edge detection algorithm predicting boundaries between objects in the predicted segmentation map and the ground truth labels, generation of the loss function being based on a result of the edge detection algorithm;
wherein:
the result of the edge detection algorithm is a mask that covers pixels of the predicted boundaries;
the mask includes a respective element for each pixel;
a loss matrix including a matrix element for each pixel is calculated by relating the predicted segmentation map to the ground truth labels; and
each element of the mask is multiplied by the corresponding matrix element of the loss matrix for each pixel when generating the loss function.

12. The system of claim 11, wherein the edge detection algorithm is applied to the predicted segmentation map only.

13. The system of claim 11, wherein the edge detection algorithm is applied to the ground truth labels only.

14. The system of claim 11, wherein the edge detection algorithm is applied to the predicted segmentation map and the ground truth labels.

15. The system of claim 14, wherein a result of applying the edge detection algorithm to the predicted segmentation map and a result of applying the edge detection algorithm to the ground truth labels are merged by selecting a maximum value of the respective results for each pixel.

16. The system of claim 11, wherein the result of the edge detection algorithm is applied to a result of relating the predicted segmentation map to the ground truth labels for generating the loss function.

17. A non-transitory computer-readable medium comprising computer-executable instructions that, when executed by a processing device, cause the processing device to:
receive an image from a sensor device, the image including a plurality of pixels;
implement a neural network to estimate a respective probability value for each pixel, each respective probability value indicating a probability for a respective pixel being associated with one of a plurality of pre-determined classes;
assign one of the plurality of pre-determined classes to each pixel of the image based on the respective probability values for each pixel to create a predicted segmentation map for the image;
generate a loss function for training the neural network by relating the predicted segmentation map to ground truth labels; and
apply an edge detection algorithm to at least one of the predicted segmentation map and the ground truth labels, the edge detection algorithm predicting boundaries between objects in the predicted segmentation map and the ground truth labels, generation of the loss function being based on a result of the edge detection algorithm;
wherein:
the result of the edge detection algorithm is a mask that covers pixels of the predicted boundaries;
the mask includes a respective element for each pixel;
a loss matrix including a matrix element for each pixel is calculated by relating the predicted segmentation map to the ground truth labels; and
each element of the mask is multiplied by the corresponding matrix element of the loss matrix for each pixel when generating the loss function.

* * * * *

UNITED STATES PATENT AND TRADEMARK OFFICE
CERTIFICATE OF CORRECTION

PATENT NO. : 12,211,297 B2  
APPLICATION NO. : 17/579536  
DATED : January 28, 2025  
INVENTOR(S) : Ido Freeman et al.

Page 1 of 1

It is certified that error appears in the above-identified patent and that said Letters Patent is hereby corrected as shown below:

On the Title Page

Page 2, Column 2, item (56) Other Publications, Line 14: Delete "Do" and insert --Ido-- therefor Signed and Sealed this  
Fifteenth Day of April, 2025

Coke Morgan Stewart  
*Acting Director of the United States Patent and Trademark Office*